M. B. RUPP.
Grain Drill.
No 28,778.
Patented June 19, 1860.
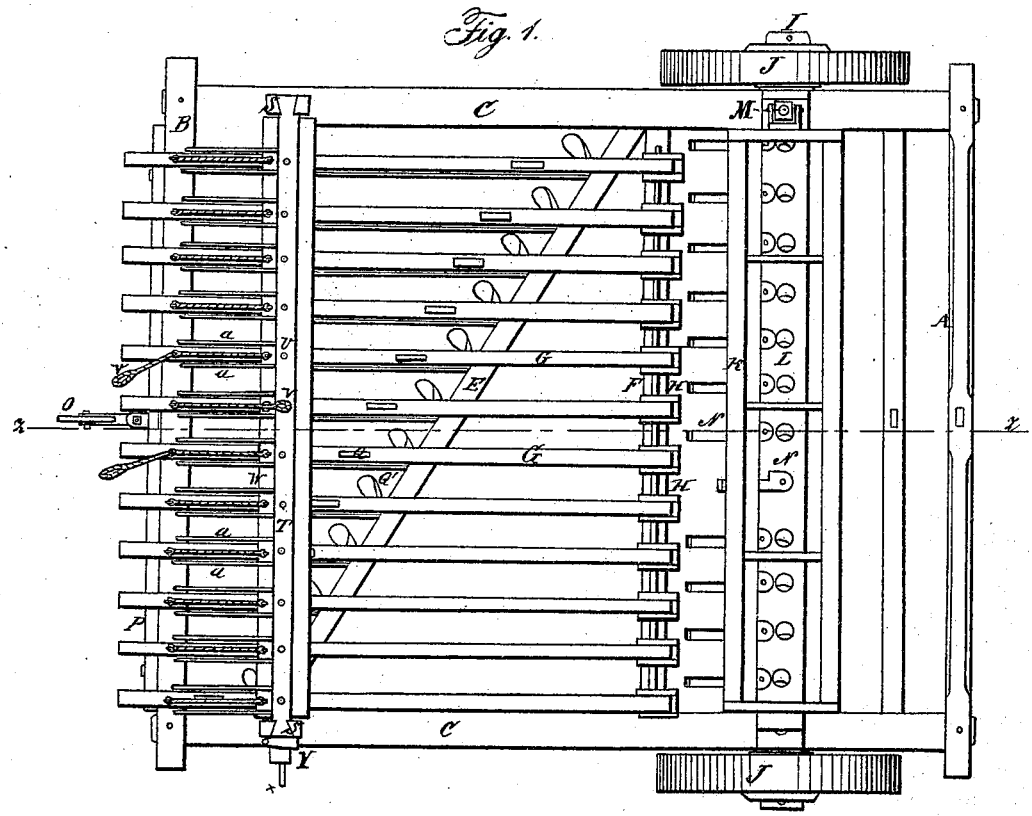
Witnesses:
Inventor:

UNITED STATES PATENT OFFICE.

MAHLON B. RUPP, OF McVEYTOWN, PENNSYLVANIA.

IMPROVEMENT IN SEEDING-MACHINES.

Specification forming part of Letters Patent No. 28,778, dated June 19, 1860.

*To all whom it may concern:*

Be it known that I, MAHLON B. RUPP, of McVeytown, in the county of Mifflin and State of Pennsylvania, have invented certain new and useful Improvements in Seeding Gang-Plows; and I do hereby declare that the same are described and represented in the following specifications and drawings.

To enable others skilled in the art to make and use my improvements, I will proceed to describe the construction and operation, referring to the drawings, in which the same letters indicate like parts in each of the figures.

Figure 1 is a plan or top view. Fig. 2 is a sectional elevation on the line $z\ z$ of Fig. 1.

In the accompanying drawings, the frame of the machine is shown, consisting of the front bar, A, rear bar, B, connected by the side bars, C C, which side bars are also connected by the cross-bar D in rear of the front bar, A, and by the diagonal bar E, and by a second cross-bar, F, to which the fore ends of the plow-beams G G are hinged by means of the stands H H, fastened to the bar F. The fore end of the frame is supported and carried by the rotating axle I, which turns freely in holes in the side bars, C C, and is mounted on the wheels J J, one of which is fastened firmly to the axle, so as to turn it and deliver or distribute the seed to be sown and covered by the plows. The axle I is perforated with holes to receive and deliver the seed, and these holes may be made deep or shallow, so as to deliver more or less seed, as required, by turning the screws inserted therein.

The seed-box K is fastened to the bars C C right over the axle I, and the bottom of the box is hollowed out to fit the curve of the surface of the axle. The bottom of the box is perforated to correspond with the holes in the axle, so as to supply the seed to the holes in the axle which receive it, and, as the axle turns, the seed in the holes is carried around and falls out onto the ground before the plows, which follow and cover it. The seed-box K has an inner bottom, L, perforated to correspond with the bottom under it, and this inner bottom is arranged to slide, and may be traversed by the lever M, so as to close and open the holes which supply the seed and graduate the quantity supplied to the axle or cut it off entirely while turning or passing from one field to another. The bottom L is provided with small slides N N, arranged to close the holes in the bottom, or such part of them as are not wanted for use in working the machine.

The lever M is arranged to vibrate in a stand fastened to the end of the seed-box.

A pole may be fastened to the bars A and D, to which the animals may be harnessed in some convenient manner which are to draw the machine.

The rear end of the frame is supported by the caster-wheel O. The spindle of this caster turns in a stand fastened to the rear bar, B. The gage-board P has perpendicular slots in it for the bolts which fasten it to the bar B. This board P holds up the rear ends of the beams G G, so that by adjusting the height of this board the plows are adjusted so as to stir or plow the ground to the depth required.

There is a standard, Q, fastened into each beam G, and the point, share, and mold-board, which are all made in one piece, are fastened to the lower ends of the standards Q, and the bars R R, from the bar B to the bar E, hold the standards Q against the pressure of the earth on the mold-board.

The standards S S are fastened in the bars C C to support the bar T, which is provided with pins U for the loops V, which may be hitched over the pins, so as to hold up such of the plows as are not needed; and the roller W is arranged to turn in the standards S S, and is provided with a crank, X, and pawl Y, and there is a cord from each of the beams to this roller, so that by turning the crank all the beams and plows may be raised at once and the pawl applied to hold them up when required to turn at the ends of the furrows or move to another place. The rods $a\ a$, fastened in the bars B and T, prevent the rear ends of the beams from vibrating sidewise.

I believe I have described and represented my improvements in seeding gang-plows so as to enable any person skilled in the art to make and use it. I will now state what I desire to secure by Letters Patent, to wit:

I claim—

The arrangement of the plows Q', upper guides, $a$, lower guides, R, adjustable board P, caster-wheel O, and the seeding apparatus, the whole being constructed as described.

M. B. RUPP.

Witnesses:
J. DENNIS,
JOHN S. HOLLINGSHEAD.